(12) United States Patent
Jahnle et al.

(10) Patent No.: US 12,576,563 B2
(45) Date of Patent: Mar. 17, 2026

(54) HYBRID MANUFACTURE OF THREE-DIMENSIONAL COMPONENTS

(71) Applicant: Robert Bosch GmbH, Stuttgart (DE)

(72) Inventors: Hendrik Jahnle, Leutenbach (DE); Mario Joost, Leonberg (DE); Tim Eidenpencz, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 18/294,229

(22) PCT Filed: Jul. 8, 2022

(86) PCT No.: PCT/EP2022/069048
§ 371 (c)(1),
(2) Date: Feb. 1, 2024

(87) PCT Pub. No.: WO2023/016720
PCT Pub. Date: Feb. 16, 2023

(65) Prior Publication Data
US 2024/0351252 A1 Oct. 24, 2024

(30) Foreign Application Priority Data
Aug. 10, 2021 (DE) ..................... 10 2021 208 698.5

(51) Int. Cl.
*B29C 35/02* (2006.01)
*B29C 39/02* (2006.01)
(Continued)

(52) U.S. Cl.
CPC .............. *B29C 39/02* (2013.01); *B29C 39/26* (2013.01); *B29C 39/38* (2013.01); *B29C 39/44* (2013.01); *B33Y 80/00* (2014.12)

(58) Field of Classification Search
CPC ................ B29C 39/44; B29C 35/0288; B29C 2033/385; B29C 33/3842; B29C 33/38
See application file for complete search history.

(56) References Cited

U.S. PATENT DOCUMENTS 5,194,197 A * 3/1993 Munk .................. G01N 33/442
374/53
2005/0015171 A1 1/2005 Cruz-Uribe et al.
(Continued)

FOREIGN PATENT DOCUMENTS

DE 102016222558 A1 5/2018
JP 2001341142 A 12/2001
(Continued)

OTHER PUBLICATIONS

Translation of International Search Report for Application No. PCT/EP2022/069048 dated Oct. 25, 2022 (2 pages).

*Primary Examiner* — Matthew J Daniels
(74) *Attorney, Agent, or Firm* — Michael Best & Friedrich LLP

(57) ABSTRACT

A method (100) for manufacturing a three-dimensional object (1), said method comprising the following steps:
a three-dimensional mold (2) defining an interior space (21) is provided (110);
a filling material (3) comprising at least one liquid or past-like monomer is introduced (120) into the interior space (21);
the monomer is polymerized (130) to produce a polymer, the temperature (3a) of the filling material (3) and/or the temperature (2a) of an outer surface of the three-dimensional mold (2) being monitored (140); and
on the basis of the results (2a, 3a) of this monitoring operation, the quality (1a) of the object (1) is assessed (150) and/or at least one measure (4) is taken (160) in order to direct the temperature (2a, 3a) in a desired direction.

7 Claims, 2 Drawing Sheets

(51) Int. Cl.

| | | |
|---|---|---|
| *B29C 39/26* | (2006.01) | |
| *B29C 39/38* | (2006.01) | |
| *B29C 39/44* | (2006.01) | |
| *B33Y 80/00* | (2015.01) | |

(56) References Cited

U.S. PATENT DOCUMENTS

| | | | |
|---|---|---|---|
| 2013/0170171 A1 | 7/2013 | Wicker et al. | |
| 2016/0039006 A1* | 2/2016 | Amstutz | B22D 19/16 |
| | | | 428/650 |
| 2020/0223127 A1 | 7/2020 | Jahnle et al. | |
| 2021/0079151 A1* | 3/2021 | Furuya | G02B 1/041 |

FOREIGN PATENT DOCUMENTS

| | | | |
|---|---|---|---|
| JP | 2007038499 A | 2/2007 | |
| JP | 2019171879 A | 10/2019 | |

* cited by examiner

| 111 | 112 | 113 |

2,21

120

3

2+3

130

2+3 → 1

141

141a 2a,3a

140

142

142a

2a#,3a#

2a,3a,2a#,3a#

| 151 |
| 152 |
| 153 |
| 154 |

150

| 161 |
| 162 |
| 163 |

160

4

1a

HYBRID MANUFACTURE OF THREE-DIMENSIONAL COMPONENTS

BACKGROUND

The present invention relates to the manufacture of components as a composite of a three-dimensional mold and a filling material.

Three-dimensional objects of any shape can be produced by 3D printing. Most 3D printers build the object to be manufactured in layers from bottom to top by adding material to the object at each position that is part of the object within the layer.

In the construction of a new layer, molten material is often applied to already solidified material. Thus, the strength with which two layers adhere to one another is often less than the strength of a single layer against tensile stress or shear in the plane of the layer. Furthermore, the 3D printing of a solid shape may take a very long time. Therefore, DE 10 2016 222 558 A1 discloses a 3D printing method in which a printed structure is filled in with a monomer, and this monomer is then polymerized.

SUMMARY

In the context of the invention, a method for manufacturing a three-dimensional object has been developed.

The method begins with providing a three-dimensional mold defining an interior space. In particular, a structure fabricated by 3D printing can be provided as a three-dimensional mold, for example. This is particularly cost-efficient, for example in small-volume manufacturing in batch sizes in the single- or double-digit range, because no high set-up and tooling costs are incurred.

A filling material comprising at least one liquid or paste-like monomer is introduced into the interior space. The monomer is polymerized into a polymer, the temperature of the filling material and/or the temperature of an outer surface of the three-dimensional mold being monitored. On the basis of the results of this monitoring operation, the quality of the object is assessed and/or at least one measure is taken in order to direct the temperature in a desired direction.

It has been found that the polymerization of the monomer to the polymer is optimal only within a relatively narrow temperature window, but at the same time the temperature of the filling material varies greatly during polymerization, especially in objects having a large volume. For example, the polymerization of caprolactam to Polyamide 6 proceeds optimally in the temperature window between 14° and 220° C.

At the same time, the temperature of the filling material must not rise above the temperature at which the three-dimensional mold softens, or even deteriorates. In this case, there would no longer be certainty that the object ultimately produced has the precise shape previously given to the mold during the 3D printing. For polyamide as a 3D-printable material for the mold, the limit is about 200° C. For reasons of temperature dynamics, it is also important that the polymerization is an exothermic reaction. Heat from polymerization and crystallization arise, with the heat outputs depending on the reaction rate.

The spatial change in temperature can be clearly understood through the example of a solid cup with a handle. Heat can build up inside the cup and the filling material might overheat. In the handle, on the other hand, the heat has a much shorter path to travel to get from inside to the outer surface.

Therefore, evaluating the quality of the object can include, for example, determining the extent to which the temperature of the filling material has extended throughout the region provided for polymerization;

the extent to which the temperature of the three-dimensional mold has exceeded a specified maximum value locally (or has fallen below a minimum value);

the temperature-time profile under which the object has cooled;

the extent to which the temperature of the filling material and/or of the three-dimensional mold deviates from a prediction determined based on a model.

The temperature-time profile also determines crystallinity as well as possible mechanical stresses in the solidified filling material.

A deviation of the temperature from a determined prediction need not directly physically affect the quality of the object, but can show that the manufacturing process has not proceeded as planned in some respect. There is then at least an initial suspicion that the quality of the component also does not correspond to the original plan. For example, leakage may have occurred in the process, or the object may have been contaminated. For example, heaters in the manufacturing system may also have failed.

Alternatively, or in combination, the temperature can be actively directed in a desired direction in order to evaluate the quality of the object. In particular, the measures that make sense here can, for example, have to do with whether the temperature only needs to be corrected locally in certain areas, or if it must be corrected globally.

For example, the temperature of a furnace in which the monomer is polymerized, and/or a residence time of the object in the furnace may be changed. In this way, the temperature can in particular be corrected globally. Furthermore, the change acts on the object from outside in, so that to a certain extent the temperature can preferably be corrected outside of the object.

For example, the temperature at which the monomer is introduced into the interior space of the three-dimensional mold can be changed. The temperature can be corrected globally this way as well. The change in temperature propagates from the point at which the monomer is introduced into the interior space.

The object can also be locally heated or cooled, for example. For example, an infrared beam or a laser beam may be used for local heating. An air nozzle may be used for local cooling, for example.

In a particularly advantageous embodiment, monitoring the temperature includes measuring the temperature at a plurality of locations and using these temperatures to determine the temperature at at least one other location in the filling material and/or in the three-dimensional mold. The spatial temperature distribution can in particular be used to, for example, determine how far toward completion the polymerization has come in the object as a whole. This, in turn, is a measure of the mechanical strength of the object, which is to be verified in the context of quality management, for example.

For example, the locations where the temperature is to be measured may be scanned using an infrared thermometer. However, a thermal image of the object can also be prepared, for example, and the temperatures to be measured can be extracted from this thermal image.

The temperature at the at least one further location in the filling material can in particular be determined using a parameterized model, for example, the parameters of which are trained based on measurements of the temperature at locations within the filling material. The model is then a kind of "digital twin" of the object, and temperatures at any location inside the object can be read off from this model.

For example, for the training of the model, test objects can be manufactured, into which temperature sensors are inserted at certain positions in the interior space of the three-dimensional mold. These temperature sensors are infused once the filling material is introduced, and can no longer be removed after solidification of the filling material. Thus, this type of temperature monitoring cannot typically be performed on objects intended to be used for purpose or sold. However, if the model has learned the relationship between the temperatures measured at accessible locations on the one hand and the temperatures prevailing at inaccessible locations inside the filling material on the other, a measurement of the temperatures at the accessible locations is sufficient to determine the temperature profile inside the object, at least approximately. In particular, the model can, for example, include a machine learning model, such as a neural network. When setting up the model, in particular, existing know-how in classical filling simulation from injection molding can be relied upon.

For the insertion of temperature sensors at locations in the interior space of the three-dimensional mold for the purpose of training the model, accesses can be kept open, in particular when providing the three-dimensional mold, for example. Then, the three-dimensional mold no longer has to be changed by hand.

In a particularly advantageous embodiment, locations where a measurement of the temperature is intended are marked and/or prepared at the time the three-dimensional mold is provided. For example, at each of these locations, a hole or depression can be introduced into the three-dimensional mold to locally reduce the wall thickness of the three-dimensional mold. The temperature measured at these locations then follows the temperature of the filling material very well.

In a further advantageous embodiment, at least one location on the outer surface of the three-dimensional mold where a local temperature maximum or minimum is to be expected due to the geometry of the mold is selected as the location for the temperature measurement. These temperatures are already meaningful in and of themselves because as in the context of polymerization, the main aim is to maintain the reaction temperature within a predetermined corridor. Distinctive locations with regard to a local temperature minimum or maximum are, in particular, inner edges, holes, or areas with the largest wall thickness of the three-dimensional mold.

The invention may be computer-implemented in whole or in part, and thus may be embodied in software. The invention therefore also relates to a computer program including machine-readable instructions which, when executed on one or more computers, cause the computer or computers, and/or a manufacturing system controlled by the computer or computers, to carry out the method described. In this context embedded systems and process controllers in particular, which are capable of processing machine-readable instructions, must also be considered as computers.

Likewise, the invention also relates to a machine-readable data storage medium and/or to a download product including the computer program. A download product is a digital product that can be transmitted via a data network, i.e., can be downloaded by a user of the data network, and may, for example, be offered for sale in an online shop for immediate download.

Furthermore, a computer may be equipped with the computer program, with the machine-readable storage medium, or with the download product.

BRIEF DESCRIPTION OF THE DRAWINGS

Further measures improving the invention are described in more detail below on the basis of the figures, together with the description of the preferred exemplary embodiments of the invention.

The figures show:

FIG. 1 an exemplary embodiment of method 100, and

DETAILED DESCRIPTION

Figure 2:
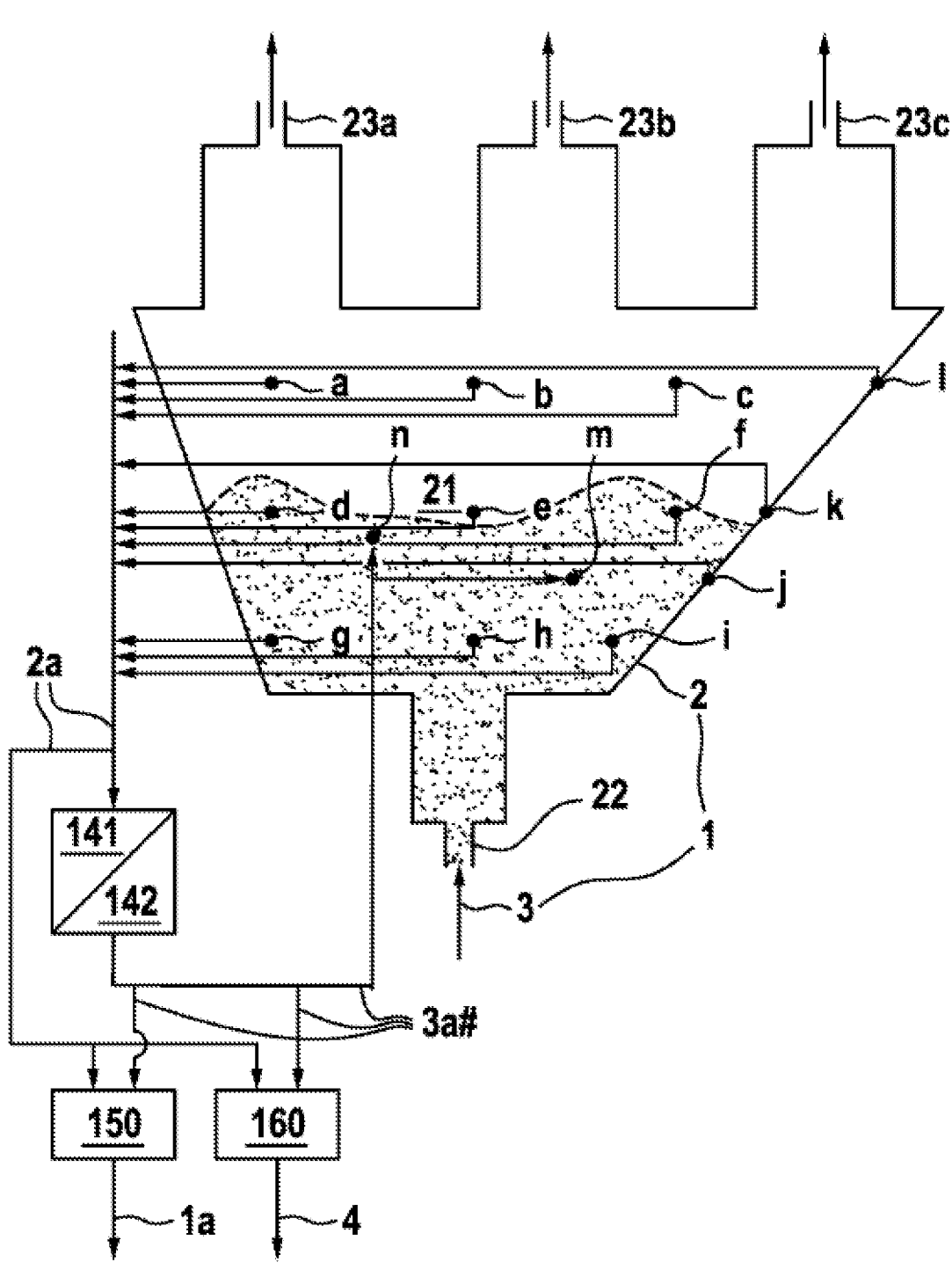
FIG. 2 a sectional view of a three-dimensional object 1.

FIG. 1 is a schematic flow diagram of an exemplary embodiment of the method 100 for manufacturing a three-dimensional object 1.

In step 110, a three-dimensional mold 2 defining an interior space 21 is provided. According to block 111, a structure manufactured by 3D printing may be provided as a three-dimensional mold 2.

In step 120, a filling material 3 comprising at least one liquid or paste-like monomer is introduced into the interior space 21.

In step 130 the monomer is polymerized to a polymer. Meanwhile, in step 140, the temperature $3a$ of the filling material 3 and/or the temperature $2a$ of an outer surface of the three-dimensional mold 2 is monitored.

Based on the results $2a$, $3a$ of this monitoring, in step 150 the quality $1a$ of the object 1 is assessed. Alternatively or in combination, at least one measure 4 can be taken in step 160 to direct the temperature $2a$, $3a$ in a desired direction.

According to block 141, monitoring the temperature may include measuring temperature $2a$, $3a$ at a plurality of locations. According to block 142, the temperature $2a\#$, $3a\#$ at at least one further location in the filling material 3 and/or in the three-dimensional mold 2 may then be determined using these temperatures $2a$, $3a$. For this purpose, in particular for example according to block 112, locations where a measurement of the temperature is intended are marked and/or prepared at the time the three-dimensional mold 2 is provided.

In particular, according to block 141a, for example, at least one location on the outer surface of the three-dimensional mold 2 where a local temperature maximum or minimum is to be expected due to the geometry of the mold is selected as the location $2a$ for the temperature measurement.

In particular, according to block 142a for example, the temperature ($2a\#$, $3a\#$) at the at least one further location in the filling material 3 may be determined using a parameterized model, the parameters of which are trained based on measurements of the temperature at locations within the filling material 3. To facilitate these measurements for the training of the model, in particular in accordance with block 113, for example, in providing the three-dimensional mold 2, accesses for introducing temperature sensors at specified locations inside the interior space 21 of the mold 2 may be kept open.

Evaluating the quality $1a$ of the object 1 can, for example, include determining the extent to which the temperature $3a$ of the filling material 3 has extended throughout the region provided for polymerization (block 151);

the extent to which the temperature $2a$ of the three-dimensional mold $2$ has exceeded a specified maximum value locally (or has fallen below a minimum value) (block $152$);

the temperature-time profile under which the object $1$ has cooled (block $153$);

the extent to which the temperature of the filling material $3$ and/or the three-dimensional mold $2$ deviates from a prediction determined on the basis of a model (block $154$).

Measure $4$ for directing the temperature $2a$, $3a$ may in particular comprise, for example, changing the temperature of a furnace in which the monomer is polymerized and/or a residence time of the object $1$ in the furnace (block $161$); and/or changing the temperature at which the monomer is introduced into the interior space $21$ of the three-dimensional mold (block $162$); and/or locally heating or cooling the object $1$ (block $163$).

FIG. $2$ shows an exemplary snapshot of the performing of the method $100$ during filling of filling material $3$ into a three-dimensional mold $2$. The three-dimensional mold $2$ is shown in a cross-sectional drawing and has an inlet $22$ for the filling material $3$ as well as three risers $23a$-$23c$ through which air can escape from the mold $2$ so that it does not resist the filling of the filling material $3$. Twelve measurement points a-l are marked on the outside of the three-dimensional mold $2$. At these measurement points a-l, according to block $142$ of the method $100$, the temperature $2a$ of the outer surface of the mold $2$ is measured. Using a previously trained model, according to block $142$ of the method $100$, the temperature $3a\#$ can be calculated at any location within the filling material $3$ in the mold $2$ from the temperatures measured at locations a-l, in this case the temperature at points m and n. The directly measured temperatures $2a$ at the outer surface of the mold $2$ as well as the calculated temperatures $3a\#$ at other locations within the filling material $3$ can then be used, in step $150$ of the method $100$, to evaluate the quality $1a$ of the object $1$ made up of the mold $2$ and the filling material $3$, and/or in step $160$ of method $100$ to determine an action $4$ by which to direct the temperature $2a$ at the outer surface of the mold $2$ and/or the temperature $3a$ in the filling material $3$ in a desired direction.

The invention claimed is:

1. A method ($100$) for manufacturing a three-dimensional object ($1$), comprising the steps of:

a three-dimensional mold ($2$) defining an interior space ($21$) is provided ($110$);

a filling material ($3$) comprising at least one liquid or paste monomer is introduced ($120$) into the interior space ($21$);

the monomer is polymerized ($130$) into a polymer, a temperature ($2a$) of an outer surface of the three-dimensional mold ($2$) being monitored ($140$) at a plurality of locations ($141$) on the outer surface of the three-dimensional mold ($2$) to determine an internal temperature ($2a\ \#$, $3a\ \#$) at at least one location in the filling material ($3$) and/or on an internal surface of the three-dimensional mold ($2$) using the measured temperatures ($2a$, $3a$) of the plurality of locations ($141$) on the outer surface of the three-dimensional mold ($2$), the determining step using a parameterized model ($142a$), the parameters of which have been previously trained based on measurements of temperature at locations within the filling material ($3$), on the basis of the results ($2a$, $3a$) of the monitoring, a quality ($1a$) of the object ($1$) is assessed ($150$) and/or at least one measure ($4$) is taken ($160$) based upon the determined internal temperature in order to direct the temperature ($2a$, $3a$) in a desired direction.

2. The method ($100$) according to claim $1$, wherein a structure manufactured by 3D printing is provided ($111$) as the three-dimensional mold ($2$).

3. The method ($100$) according to claim $1$, wherein at least one location on the outer surface of the three-dimensional mold ($2$) at which a local temperature maximum or minimum is to be expected based on a geometry of the mold is selected as a location ($2a$) for the temperature measurement ($141a$).

4. The method ($100$) of claim $1$, wherein locations where a measurement of temperature is intended are marked and/or prepared ($112$) when the three-dimensional mold ($2$) is provided.

5. The method ($100$) according to claim $1$, wherein accesses for introducing temperature sensors are kept open ($113$) at specified locations in the interior space ($21$) of the mold ($2$) when providing the three-dimensional mold ($2$).

6. The method ($100$) according to claim $1$, wherein the assessing of the quality ($1a$) of the object ($1$) includes determining an extent to which the temperature ($3a$) of the filling material ($3$) has extended throughout a region provided for polymerization ($151$);

an extent to which the temperature ($2a$) of the three-dimensional mold ($2$) has locally exceeded a specified maximum local value or fallen below a specified minimum value ($152$);

a temperature-time profile under which the object ($1$) has cooled ($153$);

an extent to which the temperature of the filling material ($3$) and/or of the three-dimensional mold ($2$) deviates from a prediction determined on a basis of a model ($154$).

7. The method ($100$) according to claim $1$, wherein the measure ($4$) for directing the temperature ($2a$, $3a$) comprises changing a temperature of a furnace in which the monomer is polymerized and/or a residence time of the object ($1$) in the furnace ($161$); and/or changing ($162$) a temperature at which the monomer is introduced into the interior space ($21$) of the three-dimensional mold; and/or locally heating or cooling ($163$) the object ($1$).

* * * * *